United States Patent Office 3,122,319
Patented Feb. 25, 1964

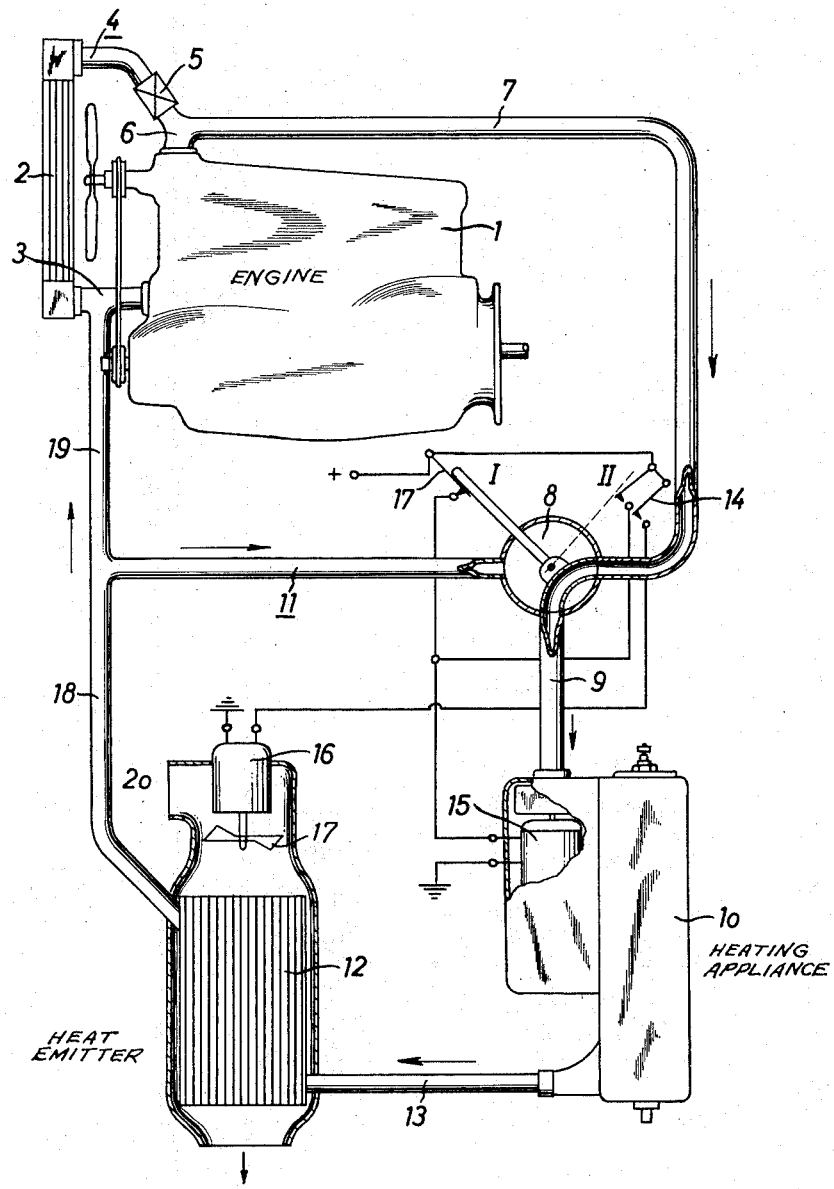

3,122,319
HEATING INSTALLATION FOR MOTOR
VEHICLES
Reiner Friedl, Starnberg, Upper Bavaria, and Robert von
Linde, Grafelfing, Munich, Germany, assignors to
Webasto Werk G.m.b.H., Stockdorf, near Munich,
Germany
Filed Mar. 1, 1962, Ser. No. 176,699
Claims priority, application Switzerland Mar. 8, 1961
3 Claims. (Cl. 237—8)

The invention relates to heating installations for vehicles, more especially for motor vehicles driven by a water cooled engine. It is concerned with an installation in which a change-over cock of a heating device independent of the vehicle engine, and a heat emitter, are connected in series, and being adapted to be short circuited by the change-over cock, in one position of the cock, through a short-circuit pipe.

Heating devices are known for motor vehicles equipped with a water-cooled engine in which the engine, cooler, changeover cock, heat emitter, and heating means independent of the engine of the vehicle, are arranged in series, a short circuit line being switches on through a change-over cock, and in an appropriate position the change-over cock closes the circuit of the cooling medium through the heat emitter and the heating device.

These heating installations however operate only very sluggishly and for that reason are not successful in practice.

It is the object of the present invention to provide a heating installation for vehicles by which a substantially shorter heating up time can be achieved than with the known heating systems.

According to the invention the driving engine is connected in parallel with the cooler, and a thermostat is provided in one of the connection pipes, while the other connection pipe is connected with a short circuit line, and a line branching off from the connection pipe between the thermostat and the driving engine leads to a change-over cock, where it is closed by the cock in one position, while in another position of the cock it is connected with the line which leads to the heating appliance.

In a preferred embodiment of the invention the change-over cock is in the position in which the vehicle engine is switched in series with the heating device and the heat emitter, simultaneously switches on the motor of the heating device. In this way, actuation and adjustment of the installation to engine pre-heating is possible with only a single manipulation.

In the following description, referring to the accompanying drawing, one example of construction of a heating device according to the invention is described, whereby other characteristic features and advantages of the invention are demonstrated.

In the heating installation as shown in the aforesaid drawing, 1 denotes a water-cooled vehicle engine which is connected to a cooler 2 by way of pipes 3 and 4. In the pipe line 4 is mounted a thermostat 5 which opens the passage to the cooler 2 only at a predetermined temperature of the cooling medium. From the part 6 of the pipe 4, between the thermostat 5 and the vehicle engine 1, a pipe 7 branches off and leads to a change-over cock 8. A pipe 9 connects a heating device 10 with the change-over valve or cock 8. The heating device 10 is employed to provide an auxiliary source of heat to heat the coolant of the engine 1. The coolant which is heated in the heating device 10 by a source of heat, for example, by a burner fed from the fuel storage of the vehicle, passes through a connection pipe 13. When the valve 8 is in the position II, shown by a dotted line in the drawing, a closed heating circuit is established through a short circuit pipe 11, a heat emitter 12 and the connection pipe 13. A two-pole switch 14 is closed by the valve in this position, whereby, as can readily be seen from the wiring diagram, a driving motor 15 of the heating device 10 and a fan motor 16 with fan 17 are placed in circuit.

In the position I, shown in the drawing, of the change-over valve 8, on the other hand, only a switch 17 is closed so that only the driving motor 15 of the heating device 10 receives current. In this switch position, therefore, a pre-heating of the vehicle engine 1 takes place, the engine being connected in a closed heating circuit through the pipes 7 and 9, heating appliance 10, pipe 13, heat emitter 12, a pipe 18, the short-circuit pipe 11 and a pipe 19 branching off from the short-circuit pipe 11 and leading to the pipe 3.

Since in position I of the change-over valve the motor 16 of the heat emitter 12 is out of operation, the latter gives off relatively little heat, with the result that the heat generated by the heating appliance 10 is applied almost entirely to the vehicle engine, until the cooling water reaches a temperature at which the thermostat 5 opens. In a preferred embodiment of the invention, a further switch position is provided (not illustrated in the present context for simplicity's sake) in which in the position I of the change-over valve 8 the circuit of the driving motor 15 of the heating means 10 is interrupted and in its place the circuit of the motor 16 of the heat transmitter 12 can be closed. In this way, therefore, the installation then operated as a heating system dependent on the engine, because, conversely, when the engine is running, it sends the cooling water which it has heated, through the heating emitter 12 which then receives a supply of air to be heated through the blower driven by the motor 16.

In a simple form of construction, however, the above-mentioned switch position is not required, if simply a means is provided for switching off the driving motor 15 of the heating device 10 and connecting the inlet 20, of the heat transmitter 12 through a pipe with an aperture in the vehicle directed to receive air as the result of movement of the vehicle.

In such case the installation operates, when the motor 15 is switched off, purely as a heating system dependent on the vehicle engine, whereas with the motor 15 switched on, the heating means 10 supplies additional heat, a factor which is of advantage to the more speedy heating up of the vehicle or when the weather is exceptionally cold.

The invention is not limited to the example of construction illustrated and described herein, but may be realised in practice also in the most diverse modifications.

What we claim is:

1. A heating system for a motor vehicle having in combination a liquid cooled engine; a radiator; a first and a second connection pipe connecting said radiator to said engine in parallel relation thereto; a heating appliance normally directly communicating with said first connection pipe; heat emission means connected between said heating appliance and said second connection pipe, said heat emission means including means for directing heated air into the interior of the vehicle; a change-over valve selectively movable between two positions and connected between said first connection pipe and said heating appliance; and a short-circuit conduit having one end disposed to communicate with said heat emission means and said second connection pipe and the other end disposed to communicate with said change-over valve, said change-over valve being effective in one position to block communication between said first connection pipe and said heating appliance to thereby establish a closed circuit between said heating appliance, said heat emission means, and said short-circuit conduit, and in the other position to establish communication between said first connection pipe and said heating appliance.

2. A heating installation as claimed in claim 1 including a motor for said heating appliance; a switch coupled with said change-over valve, said valve in said one position being operative to switch on said motor of said heating appliance.

3. A heating installation as claimed in claim 1 including an electric motor for said heating appliance; a fan for said heat emitter; electric driving means for said fan; a switch coupled with said change-over valve in said other position of said change-over valve simultaneously switches on both the motor of said heating appliance and the driving means for the fan of said heat emission means.

References Cited in the file of this patent

UNITED STATES PATENTS

| | | |
|---|---|---|
| 2,507,643 | Oaks | May 16, 1950 |

FOREIGN PATENTS

| | | |
|---|---|---|
| 531,718 | Canada | Oct. 16, 1956 |
| 767,631 | France | May 7, 1934 |
| 809,112 | France | Dec. 3, 1936 |